A. U. MERSHON.
ANIMAL TRAP.
APPLICATION FILED FEB. 2, 1912.
1,068,357.
Patented July 22, 1913.
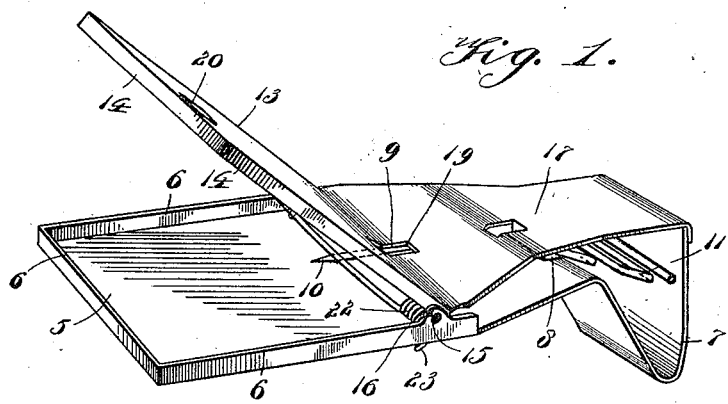
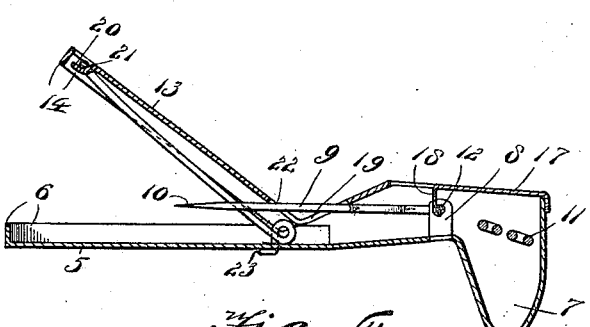
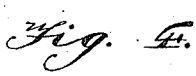
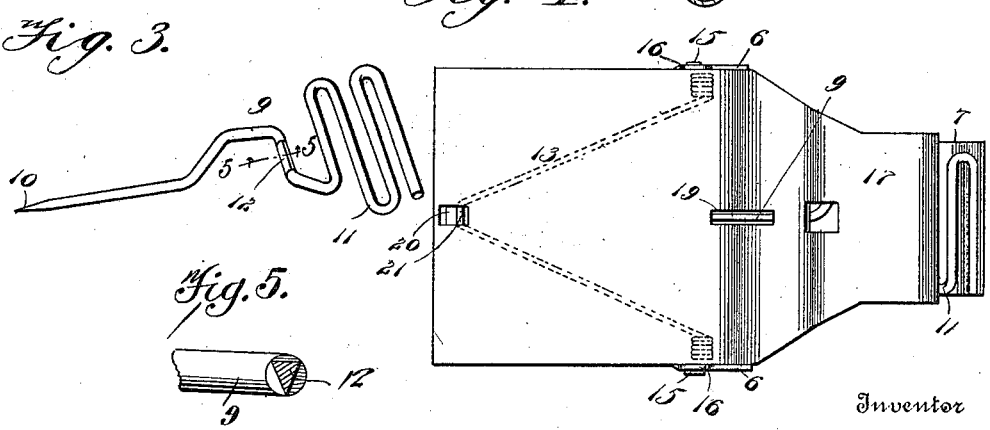
Inventor
Arthur U. Mershon.
By Victor J. Evans
Attorney
Witnesses

UNITED STATES PATENT OFFICE.

ARTHUR U. MERSHON, OF COLORADO SPRINGS, COLORADO.

ANIMAL-TRAP.

1,068,357. Specification of Letters Patent. Patented July 22, 1913.

Application filed February 2, 1912. Serial No. 674,886.

*To all whom it may concern:*

Be it known that I, ARTHUR U. MERSHON, a citizen of the United States, residing at Colorado Springs, in the county of El Paso and State of Colorado, have invented new and useful Improvements in Animal-Traps, of which the following is a specification.

The invention relates to traps, and more particularly to the class of animal traps.

The primary object of the invention is the provision of a trap in which a bait is positioned therein, for accessibility by an animal, so as to attract the same, whereby it may be caught, without the liability of the escape of said animal from the trip.

Another object of the invention is the provision of a trap, in which the bait holder will lock the trap in open position, thereby assuring access to the bait upon the holder to bring the animal within the path of the closing jaw of the trap, thereby positively trapping such animal, when the trap becomes closed.

A further object of the invention is the provision of a trap which is simple in construction, thoroughly reliable and efficient in operation, and inexpensive in manufacture.

With these and other objects in view, the invention consists in the construction, combination and arrangement of parts, as will be hereinafter more fully described, illustrated in the accompanying drawings, and pointed out in the claim hereunto appended.

In the drawings: Figure 1 is a perspective view of a trap constructed in accordance with the invention, the same being shown open. Fig. 2 is a vertical longitudinal sectional view through the same. Fig. 3 is a perspective view of the bait holder. Fig. 4 is a top plan view of the trap when closed. Fig. 5 is a sectional view on the line 5—5 of Fig. 3, the same being on a large scale.

Similar reference characters indicate corresponding parts throughout the several views of the drawings.

Referring to the drawings by numerals, the trap comprises a base 5, provided at its sides and one end with upturned flanges 6, while the remaining end is extended and bent downwardly and upwardly to form a leg or prop 7 adapted to sustain the base forwardly inclined, when resting upon a floor or other foundation. The extended end of the base is cut to provide ears 8, which are upturned in spaced parallel relation to each other, and are provided with alining perforations to receive a bait holder, comprising a single strand of relative stiff wire 9, the same being passed through the perforations in the ears 8, and is bent to form a pointed bait receiving end 10 which projects forwardly centrally of and above the base, and a rearwardly extended finger engaging end 11 which, by reason of its own weight, will tend to raise the end 10 elevated above the said base, the portion of the wire 9 between the ears 8 being flattened to provide a locking catch 12, for a purpose presently described.

Connected with the side flanges 6 of the base 5, above the same, is a swingingly mounted jaw 13, the same being in shape complementary to the shape of the said base 5, and is formed at its sides and one end with downturned flanges 14, the side flanges thereof being formed with outturned trunnions or pivot lugs 15 which engage in perforated ears 16 formed on the side flanges 6 of the base, thereby pivotally connecting the said jaw 13 to the latter. The remaining end of the jaw 13 is extended upwardly and rearwardly to provide a depressible lever 17, from which is cut and bent a downwardly extending hook-like locking lip 18, the same being designed to engage with the catch 12 on the opening of the jaw 13 to hold the same open.

Provided in the jaw 13 is an elongated slot 19 which accommodates the pointed end 10 of the bait holder, when the said end is elevated and sustained in such position by the locking lip 18 engaging the catch 12 of the bait holder, the bait being inserted upon the pointed end 10 for attracting an animal into the path of movement of the jaw 13 to be caught thereby on the closing of the same.

The jaw 13 is formed with a nib 20, cut and bent therefrom, and with which engages the medial loop portion 21 of a tension spring, the same being formed with coils 22 spaced from its ends to increase the tension quality thereof, and this spring has its ends 23 suitably fastened to the base 5, so as to prevent the displacement of the spring on the opening and closing of the jaw 13. The spring will exert the requisite tension upon the jaw 13, when opened, so that on the release thereof it will instantly close for the catching of the animal, when nibbling or pulling the bait from the bait holder. It will be evident that on slightly lowering the pointed end 10 of the bait holder, the latter will rock, so that the catch 12 will disengage from the lip 18, freeing the jaw 13, whence the spring will instantly close the same upon the base.

What is claimed is—

A trap comprising a base having a V-shaped rear end forming a leg, a bait holder pivoted upon the base for rocking movement and having a catch portion of triangular shape in cross section, a closing jaw swingingly connected with the base and having a locking lip for engagement with one edge of the said catch portion of the bait holder when said jaw is opened, a finger engaging end on the bait holder and projected over said leg, whereby the bait holder may be manipulated for engaging the catch portion thereof with the locking lip, a loop spring having hook-like ends engaged in the base, and a tongue struck inwardly from the closing jaw and engaging the loop spring for connecting it thereto.

In testimony whereof I affix my signature in presence of two witnesses.

ARTHUR U. MERSHON.

Witnesses:
 MARTIN SLAUGHTER,
 A. E. GRISWOLD.

---

Copies of this patent may be obtained for five cents each, by addressing the "Commissioner of Patents, Washington, D. C."